United States Patent [19]

Appleby

[11] Patent Number: 4,555,453
[45] Date of Patent: Nov. 26, 1985

[54] METHOD FOR FORMING MOLTEN CARBONATE FUEL CELL COMPONENT AND STRUCTURE

[75] Inventor: A. John Appleby, Mountain View, Calif.

[73] Assignee: Electric Power Research, Inc., Palo Alto, Calif.

[21] Appl. No.: 307,446

[22] Filed: Oct. 1, 1981

[51] Int. Cl.⁴ .............................................. H01M 8/14
[52] U.S. Cl. ...................................... 429/41; 29/623.5; 204/181.5; 429/46
[58] Field of Search .................... 429/16, 41, 46; 29/623.5; 204/181 N

[56] References Cited

U.S. PATENT DOCUMENTS 4,329,403  5/1982  Baker ..................................... 429/16
4,389,467  6/1983  Singh et al. ........................... 429/41

Primary Examiner—Donald L. Walton
Attorney, Agent, or Firm—Flehr, Hohbach, Test, Albritton & Herbert

[57] ABSTRACT

A molten carbonate fuel cell with oppositely charged porous electrodes and a continuous electrolyte layer therebetween formed of a porous non-electrically conducting binder containing a carbonate salt. The electrolyte layer is formed by suspending the porous binder powder in a dielectric liquid vehicle and contacting it with one of the fuel cell electrodes. An electric field is applied between the electrode and a spaced counter-electrode in the suspension to cause electrophoretic deposition of the powder in a dense binder layer, adhered to and supported by the electrode. The binder layer-one electrode is assembled into a molten carbonate fuel cell, such as by affixing the binder layer side to an oppositely charged electrode plate, and incorporating the combination into a fuel cell.

16 Claims, 2 Drawing Figures

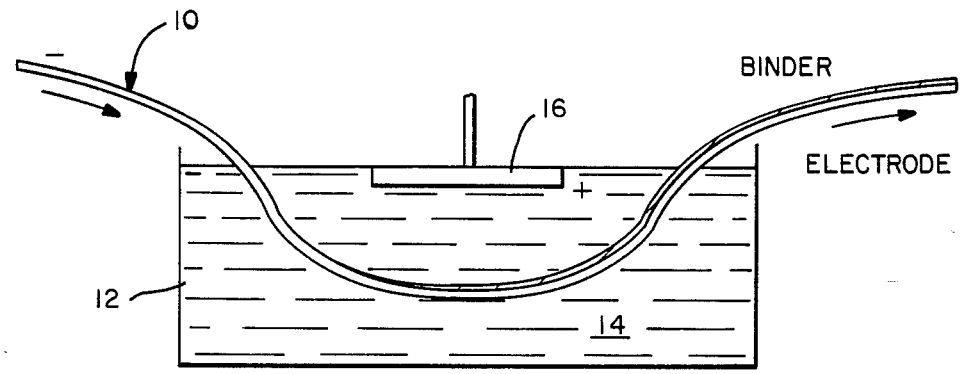
FIG.—1
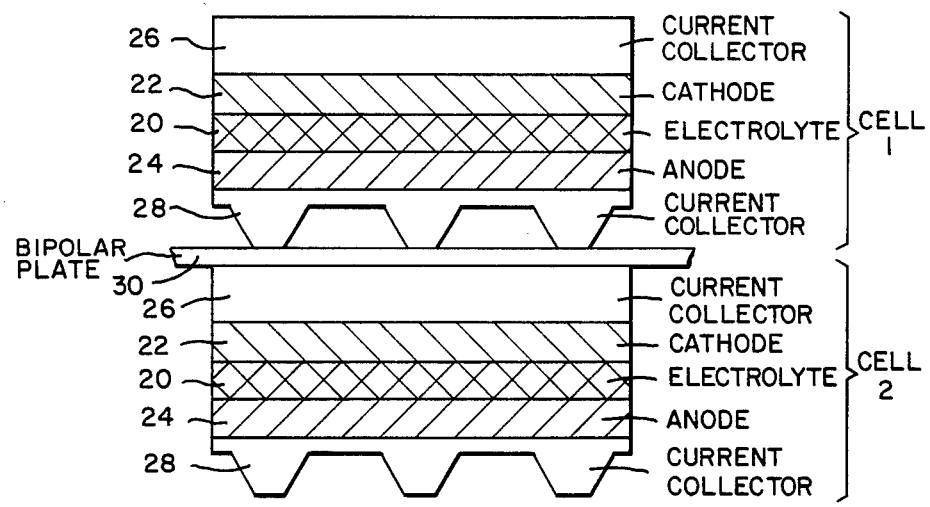
FIG.—2

METHOD FOR FORMING MOLTEN CARBONATE FUEL CELL COMPONENT AND STRUCTURE

BACKGROUND OF THE INVENTION

The molten carbonate fuel cell is an electrochemical device producing DC electricity by the oxidation of a fuel gas at an invariant electronically-conducting anode, with simultaneous reduction of oxygen, typically from air, at an invariant electronically-conducting cathode. The anodes and cathodes are separated by a thin layer of electrolyte, which includes a mixture of molten alkali metal carbonates in the temperature range of operation, typically 600° C. to 750° C. The carbonate mixture is maintained in position by capillary action with the pores of a fine stable non-electrically-conducting powder, for example, lithium aluminate, which also serves to prevent electronic shorts between the electrodes from occurring. Typically, the invariant anode is a porous sintered nickel or alloy material of sufficient thickness to store a required inventory of electrolyte, to make up losses by evaporation during a lifetime of the cell. Also, the sinter porosity is matched to the particular electrolyte binder, so that the binder remains filled by capillarity and the anode maintains an open interface with the gas phase in the pores. The electrolyte-solid electrode-gas three phase boundary is selected to provide a maximum possible area for reaction to take place, so that the electrical voltage losses resulting from irreversible polarizations at local reaction rates are minimized. The cathode typically consists of a porous invariant lithium doped nickel oxide material of appropriate porosity characteristics. The cathode is normally a thin structure due to its relatively high electronic resistance. To avoid flooding of the structure by capillary action, nickel oxide or other cathodic material of the desired characteristics is used. The anode and cathode material are maintained in their invariant conditions by the reducing and oxidizing natures of the gases supplied to them.

The remainder of the individual unit cell structure consists of anodic and cathodic current collectors, which are directly applied to the respective electrodes, and which have the requisite invariance, electronic conductivity, and ability for allowing gases to come in contact with the electrodes, typically channeled or porous structures, or both, with gases fed through the structure across the faces of the electrodes. The current collectors contact separator plates (bipolar plates) which are common to the anode and cathodes of two adjacent cells, so that a stack of individual cells similar to a Volta pile is thus formed. Each stack is individually equipped with a manifold to supply and exit gas, and with a gas-type corrosion-resistant, electronically-insulating sealer on the edge, to prevent both mixing of gases and electronic shorting of cells. The individual cell is thus sealed in contact with a frame-like structure, which typically is formed of a metal with anti-corrosion protection, such as aluminized stainless steel. The electrolyte composite layer seals across this space to the metal frame. During normal operation of a commercial cell, excursions of gas pressure can occur when operation takes place under high pressure conditions to increase performance. Therefore, the structure must be able to resist these pressure excursions without failure or cross-leakage. Furthermore, shut-downs of cell stacks occur from time to time. This requires the cell components to be thermally cycled several times, down to ambient temperature. The most sensitive component of the cell stack is the electrolyte composite layer, with a coefficient of expansion which differs from that of metal components since it is susceptible to cracking under these conditions, thus causing catastrophic failure on start-up.

At the present time, most molten carbonate fuel cells are constructed using dense hot-pressed electrolyte tiles containing electrolyte and binder, the components being premixed in powder form. High pressures are necessary to reach the densities required to prevent gas crossover. For large-scale production, such tiles cannot be made in practical sizes, e.g., several square feet, with the existing press technology. Also, the tile itself, which is a viscous fluid at cell operating temperatures, is a structural component and must be capable of free-standing, at least during manufacture. Thus, it must be relatively thick in large sizes, so that the internal cell IR losses would be high. The thick layers resulting are not thermally cyclable, and require structural reinforcement of some type (e.g., invariant metal wires or other components) if tendency to cracking is to be reduced or eliminated. Even so, this approach is not fully successful.

Among the problems inherent in the electrolyte layer of a molten carbonate fuel cell are (1) the ability to manufacture the elctrolyte layer, (2) the ability to thermally cycle the electrolyte layer, (3) maintenance of gas integrity through the electrolyte layer under different pressure conditions, and (4) the minimization of the thickness of the electrolyte layer to therefore minimize the IR drop and maximize cell performance.

SUMMARY OF THE INVENTION AND OBJECTS

In accordance with the present invention, a thin layer of non-electrically conducting electrolyte binder powder, alone or in combination with a carbonate salt electrolyte powder, is deposited from a suspension onto an electrode and solidified on the electrode for incorporation into a molten carbonate fuel cell. The deposition is formed electrophoretically by applying an electric field through the suspension between the electrode and a spaced counter-electrode. In this manner, a continuous dense binder layer is adhered to and supported by the electrode. The process may be performed continuously by passing the electrode over rollers as a continuous strip through a bath of the suspension. The carbonate salt electrolyte may be impregnated into the pores of the binder powder prior to formation of the suspension. Alternatively, the carbonate salt may be contacted with the binder after formation of the binder layer, and melted to impregnate the carbonate into the binder pores.

BRIEF DESCRIPTION OF THE DRAWINGS

FIG. 1 is a schematic representation of an apparatus for performing continuously the electrophoretic deposition of the present invention.

FIG. 2 is a schematic representation of two molten carbonate cell assemblies in a stack.

DETAILED DESCRIPTION OF THE PREFERRED EMBODIMENTS

According to the present invention, a porous non-electrically conducting binder is deposited onto an electrode suitable for use as the electrode of a molten carbonate fuel cell. A suspension of the non-electrically conducting binder powder is formed in a dielectric liquid vehicle, with the binder powder in a charged state. An electric field is applied between the electrode and a spaced counter-electrode to cause electrophoretic deposition of the powder in a continuous dense binder layer, adhered to and supported by the electrode.

Electrophoretic forming of certain materials, such as the sodium oxide-alumina phase called beta-alumina, by the application of a DC voltage between the support structure upon which the deposition is to occur and a counter-electrode, has been performed in fields other than the molten carbonate cell field. For example, ceramics have been formed by such techniques as disclosed in "The Electrophoretic Forming of Beta-Alumina", by R. W. Powers, General Electric Company Corporate Research and Development Report No. 73CRD289, October 1973, incorporated herein by reference. While the general principles of deposition disclosed therein are applicable to the present invention, self-supporting shapes are formed by such ceramic processing. Also, the beta-alumina is not used in a molten carbonate cell.

Referring to FIG. 1, apparatus is illustrated suitable for performing a continuous method for the electrophoretic deposition of the binder layer on the electrode. A flexible fuel cell electrode strip 10 is passed continuously on a suitable conveying system, such as rollers, not shown, into a vessel 12 containing a suspension 14 of the binder particles. A counter-electrode 16 of opposite charge to fuel cell electrode 10 is supported in spaced relationship to one surface of fuel cell electrode 10, submerged in suspension 14. The voltage is applied between fuel cell electrode 10 and counter-electrode 16 at a potential depending upon the distance between the electrodes, the period of deposition, and the charge occurring upon the binder being deposited. In a typical instance, between 50 and 500 volts is applied.

The binder particles are selected to be of a type which are non-electrically conductive, to be capable of electrophoretic deposition under the conditions of the process, and to be of sufficient porosity to maintain the carbonate salt electrolyte in position by capillary action within the pores of the binder layer. The binder layer prevents electronic shorts between the electrodes during operation of the fuel cell. Also, such binder must be chemically stable under the conditions of the cell.

Lithium aluminate powder, particularly in the beta state, is highly effective for use as the binder powder in the present invention. Other powders may be employed, such as chemically stable strontium titanate, magnesium oxide, lithium ferrite, calcium zirconate, and spinel and perovskite compounds with similar chemical stability to beta lithium aluminate under cell operating conditions.

To simplify the following description, lithium aluminate will be referred to as the biinder powder of the present invention. Such powder may be prepared by a molten salt solvent technique to provide a fine powder of 3 to 25 meters per gram. The powder is dried prior to preparation of the suspension.

The binder powder is milled as in a vibratory mill and graded while in suspension form. The suspension vehicle is selected so that the powder is insoluble in it, and so that the vehicle is essentially an electrical insulator. A variety of vehicles with dielectric constants between about 10 and 30 may be emplyed. The dielectric constant is important to give effective charge separation. Isopropanol has been found to be a particularly effective solvent. To avoid bubble hole formation in the deposits due to the presence of water, as described below, the solvents are pre-dried as by passage over a column of molecular sieves.

The particles must be in a charged state in the suspension to be electrophoretically deposited. They typically possess a net charge in the suspension due to non-stoichiometry, ionization, or other physiochemical effect. However, in some instances, a material can be added to the liquid vehicle which can itself be ionized, with one species of ion adsorbing onto the suspended particles, and the other remaining in solution in the vehicle. For example, a carboxylic acid may be added to the vehicle, providing protons, some of which are adsorbed on the particles to give a positive charge, and with a corresponding equivalent of carboxylic acid remaining in the solution. In an alternative procedure, a simple amine salt may be added so that amine ions remain behind and negative ions are adsorbed on the particles. The actual ions adsorbed will depend upon the surface chemistry of the particulate suspension and the nature of the vehicle. For materials such as delta-lithium aluminate, a suitable vehicle is an alcohol, such as isopropanol. Where the substrate or fuel cell electrode 10 is negatively charged, and the particles are positively charged, it is desirable that the suspended particles be water-free to avoid any gas bubble formation due to hydrogen evolution on the negatively charged substrate.

A typical fuel cell cathode may be employed in the form of porous sintered nickel powder. By variation of the solvent, the electrolyte may be deposited on either an anode or the cathode. In most cases, deposition occurs on a fuel cell cathode. However, with ketone solvents, deposition can occur on the anode.

The binder layer-electrode may be used in a fuel cell as illustrated in FIG. 2, in one of three generalized techniques. Firstly, it may be deposited on the fuel cell cathode and then pressed together with a fuel cell anode free of electrolyte to form a cell sandwich. Alternatively, the electrolyte may be deposited on the anode and combined with the cathode in a similar manner.

In a third embodiment, the electrolyte may be deposited on both one surface of an anode and one surface of a cathode, and the surfaces of the anode and cathode containing the electrolyte may be assembled facing each other to form a continuous electrolyte. The technique selected will depend upon a variety of desired cell properties, such as maintaining a gas seal around the edges of the electrolyte.

The foregoing description of electrophoretic deposition refers only to the binder. In some instances, the binder alone is deposited as a layer on the fuel cell electrode, and thereafter the carbonate salt electrolyte is impregnated into the pores of the binder layer. This can be accomplished by sprinkling the formed binder layer with carbonate salt powder, followed by melting of the carbonate powder, as by passage through a furnace. Alternatively, the binder layer may be passed through a molten carbonate bath.

In another embodiment of incorporating the carbonate electrolyte, a carbonate salt is impregnated into the binder powder before formation into a layer, and the powder is electrophoretically deposited as illustrated in FIG. 1. In yet another embodiment, the binder powder and carbonate salt powder, for example, in the form of a spray-dried mixture of both components, may be simultaneously deposited electrophoretically from the suspension bath, by appropriate modification of the charges in the bath to provide the desired ratio of deposition of binder and carboinate salt. In this instance, the relative concentration of carbonate salt to binder powder is typically from 0.8 to 1:1 by weight.

Any of the known carbonate salts useful in molten carbonate cells may be employed in accordance with the present invention. Such salts include lithium-potassium carbonate, sodium-lithium carbonate, and lithium-potassium sodium carbonate.

In accordance with the above procedures, a very thin layer of binder, alone or in combination with electrolyte, may be deposited from a suspension in a short time. For example, 250 microns of binder may be deposited in 3-4 seconds using 500 volts potential with electrodes 2 cm apart in isopropanol, and at a ratio of 1 part binder powder to 2 parts by weight of vehicle. Such layer is stable and relatively strong, with a somewhat chalky consistency when dry. At 250 micron thickness, it can be dried rapidly. As it is supported on the electrode of the fuel cell it could be handled easily, even though at such small thicknesses it is not self-supporting. Such thin layers, e.g., less than 500 microns, are particularly efficient at a correspondingly lower IR drop, in comparison to the thicker self-supporting layers formed in a conventional manner.

The effective "pressure" applied by the electrostatic field is relatively high, resulting in a dense layer. Typically the density is about 40% to 70% of the theoretical density, when a layer consisting of particles of the binder alone is employed. The field tends to break up agglomerates, resulting in a uniform layer. Furthermore, the field orients particles as they move towards the substrate surface, again improving quality and packing density.

Although the above procedure is illustrated as a continuous deposition, it should be understood that batchwise operation could be employed as well, if desired for a particular operation. In that instance, a fuel cell electrode of the desired final size is placed in the bath and removed after completion of deposition.

An electrolyte layer-electrode combination is assembled with other components into a molten carbonate fuel cell, and stacked. Referring to FIG. 2, two cells of a multiple stack molten carbonate cell are schematically illustrated. There, the electrolyte 20 is surrounded on one side by cathode 22 and on the other size by anode 24. This sandwich combination may be formed as in the manner described above. On the cathode side is a current collector 26, while on the anode side current collector 28 is provided. The current collector is of a conventional type, typically formed with hollow ribs or open channels allowing the gases to pass. Alternatively, the current collector may be part of the electrode, that is, a porous structure having provision for flow of gas by porous ribs integral with the electrode or applied to the same. In conventional molten carbonate cells, the current collector for the cathode is at right angles to the current collector for the anode. Alternatively, these structures may be constructed to allow free passage of anode and cathode gases at right angles, e.g., by discrete projections from the electrodes.

The complete cell is made by placing bipolar plate 30, of suitable electronically-conducting, corrosion-resistant materials (e.g., nickel-clad stainless steel, with nickel at the anode side) between the current collector of one cell and the corresponding current collector of an adjacent cell. As illustrated, bipolar plate 30 is between cell 1 and cell 2. The stack may include as many cells as is desired for the desired output of electricity.

The following is an example of a specific embodiment of the present invention.

EXAMPLE

A suspension is formed by milling using an isopropanol vehicle and lithium-aluminate at a specific area of $10 m^2/g$, a mean particle size of 0.3 microns and a concentration of 50 parts by weight per 100 parts by weight of vehicle. A sintered porous nickel substrate made from carbonyl-type nickel powder is passed in a continuous strip through a bath, as illustrated in FIG. 1. A direct current is applied between a positive plate electrode submerged in the bath and the strip, which is maintained at a negative charge with a potential of 125 volts being applied. The total residence time of the strip in the field is sufficient to build up the required thickness of the binder, depending on the length of the strip. For example, for a strip immersed for a length of 1 meter, this would be about 60 seconds. A uniform layer of the binder, of a thickness of 250 microns, is thus formed. Thereafter, a lithium-potassium carbonate salt powder is sprinkled onto the upper surface of the binder layer, and the strip containing such electrolyte powder is passed through a furnace under reducing, carbon dioxide-containing atmosphere maintained at a temperature of 600° C., to cause the electrolyte salt to become molten and to penetrate the pores of the electrode. Thereafter, the strip of the binder layer-cathode is cut to the desired size and pressed on the electrolyte layer side to an anode of the same size, and is assembled together with current collectors at the cathode and anode, as illustrated in FIG. 2. Individual cells of the foregoing type are stacked separated by a bipolar plate of the nickel-stainless steel type, and sealed at the edges using a dielectric. Such a cell is then used to generate electricity in a conventional manner.

What is claimed is:

1. A method for the formation of a molten carbonate fuel cell including oppositely charged porous electrodes and a continuous electrolyte layer therebetween formed of a porous non-electrically conducting binder containing a carbonate salt in its pores, comprising the steps of contacting a suspension of porous non-electrically conducting binder powder in a dielectric liquid vehicle with at least one surface of one of said fuel cell electrodes, and, with said binder powder in a charged state, applying an electric field between said one electrode and a spaced counter-electrode in said suspension to cause electrophoretic deposition of said powder in a continuous dense binder layer adhered to and supported by said one electrode.

2. The method of claim 1 in which said binder layer has a thickness which causes it not to be self-supporting.

3. The method of claim 1 in which said binder layer is characterized by a density between about 40% and 70% of theoretical density.

4. The method of claim 1 in which said binder layer is characterized by a chalk-like consistency.

5. The method of claim 1 in which a continuous strip of said one electrode is passed through a bath of said suspension in which said electrophoretic deposition occurs.

6. The method of claim 1 in which said binder layer-one electrode is assembled with other components into a molten carbonate fuel cell.

7. The method of claim 1 in which the binder layer side of said binder layer-one electrode is affixed to a second electrode plate and assembled into a molten carbonate fuel cell.

8. The method of claim 1 in which insoluble dried electrolyte powder comprising a carbonate salt is included in said suspension and, with said electrolyte powder in a charged state, electrophoretically depositing the same simultaneously with said binder powder onto said one electrode.

9. The method of claim 1 in which carbonate salt electrolyte is placed in contact with said formed binder layer and is heated to melt the carbonate and cause the molten carbonate to impregnate into the pores of said binder layer.

10. The method of claim 1 in which a molten carbonate salt electrolyte is impregnated into the pores of said binder powder and said impregnated powder is mixed with said vehicle to form said suspension.

11. The method of claim 1 in which said electrode comprises a sintered metal.

12. The method of claim 1 in which said carbonate salt is selected from the group consisting of lithium-potassium carbonate, sodium-lithium carbonate, and lithium-potassium sodium carbonate.

13. A component for a molten carbonate fuel cell comprising a porous fuel cell electrode and a continuous dense, porous, non-electrically conducting binder layer adhered to and supported by a surface of said electrode, said binder layer being of sufficient porosity to be impregnable with a carbonate salt and of insufficient thickness to be self-supporting.

14. The component of claim 13 in which said binder layer comprises lithium aluminate.

15. The component of claim 13 in which carbonate salt electrolyte is impregnated in the pores of said binder, forming an electrolyte layer.

16. A molten carbonate fuel cell including the component of claim 15.

* * * * *